United States Patent [19]

Sheldon et al.

[11] 4,241,189

[45] Dec. 23, 1980

[54] WEAR-RESISTANT FLEXIBLE SHEET MATERIAL AND A METHOD FOR ITS MANUFACTURE

[75] Inventors: Neville M. Sheldon, Whitley Bay; Alfred Stern, Newcastle upon Tyne, both of England

[73] Assignee: General Foam Products Limited, North Shields, England

[21] Appl. No.: 874,390

[22] Filed: Feb. 2, 1978

[30] Foreign Application Priority Data

Feb. 2, 1977 [GB] United Kingdom .............. 04282/77

[51] Int. Cl.$^3$ .......................... C08J 9/36; B27C 15/00; B29D 27/00
[52] U.S. Cl. ...................................... 521/50; 264/321; 264/DIG. 7; 521/918
[58] Field of Search .......................... 264/321, DIG. 7; 521/50, 918

[56] References Cited

U.S. PATENT DOCUMENTS

| | | | |
|---|---|---|---|
| 2,878,153 | 3/1959 | Hacklander | 264/DIG. 7 |
| 2,994,110 | 8/1961 | Hardy | 264/321 X |
| 3,004,293 | 10/1961 | Kreidl | 264/DIG. 7 |
| 3,035,280 | 5/1962 | Hacklander | 264/DIG. 7 |
| 3,263,010 | 7/1966 | Shultz | 264/321 |
| 3,354,578 | 11/1967 | Ryan | 264/DIG. 7 |
| 3,452,122 | 6/1969 | Stern et al. | 264/DIG. 7 |
| 3,452,127 | 6/1969 | Lovette et al. | 264/DIG. 7 |
| 3,746,610 | 7/1973 | Hoegger | 264/DIG. 7 |

FOREIGN PATENT DOCUMENTS

| | | | |
|---|---|---|---|
| 976260 | 11/1964 | United Kingdom | 264/DIG. 7 |
| 1337413 | 11/1973 | United Kingdom | 264/DIG. 7 |

*Primary Examiner*—Philip Anderson
*Attorney, Agent, or Firm*—Birch, Stewart, Kolasch & Birch

[57] ABSTRACT

A wear-resistant flexible sheet material, suitable for use as outer soles on footwear, is produced by pressing reconstituted polyurethane foam sheets in the substantial absence of air at temperatures above 150° C. The sheets should have a density exceeding 15 lb/ft$^3$ and are further densified by the hot pressing. The sheets are preferably pre-heated to 175°–210° C. and pressed under a pressure of 5 to 30 tons/ft$^2$ for periods of up to 5 minutes. The sheets may be embossed or smooth surfaced and may contain pigments, plasticizers and other additives.

14 Claims, No Drawings

WEAR-RESISTANT FLEXIBLE SHEET MATERIAL AND A METHOD FOR ITS MANUFACTURE

BACKGROUND TO THE INVENTION

The present invention relates to flexible sheet material prepared from foamed polyurethane and exhibiting good wear resistance, making it suitable for such purposes as outer soles for footwear.

Reconstituted foam materials, in which comminuted foam is bonded together with a foamable binder, have been known for some considerable time and a method for their preparation has been described in British Pat. No. 976,260. These reconstituted materials are useful, for example, in packaging and upholstery.

More recently, materials of higher density have been produced, as described in our British Pat. No. 1,337,413, in which much of the cellularity of the comminuted foam is lost by reduction to a small particle size, and in which the binder exhibits little or no expansion due to the pressure under which the product is moulded. Such denser materials are employed, for example, for insoles in the footwear industry.

SUMMARY OF THE INVENTION

It has now been discovered that if a relatively dense reconstituted foam material composed wholly or predominantly of polyurethane, more particularly a material having a density exceeding 15 lb/ft$^3$, is subjected to pressure at a temperature above 150° C. in the substantial absence of air, it can be further densified and formed into a flexible sheet material having wear resistance significantly greater than that of the original reconstituted material. In this way it is possible to make dense, yet flexible and resilient material suitable for use as outer soles and exhibiting long life in such use.

It had previously been thought that heat-forming of polyurethane materials above about 160° C. would decompose the polyurethane structure and not give useful results. However, it has been surprisingly discovered that the heat-forming of dense reconstituted foam materials is possible in the substantial absence of air. It is not, in all cases, necessary to completely enclose the material to be hot-formed; compression of sheet material between solid heating platens will often suffice. The platens exclude air from all but the peripheral edges of the original sheet, while the high density of the starting material ensures that there is little air disposed within the material. Substantial amounts of entrapped air can hinder the transfer of heat and cause embrittlement of the product through oxidative decomposition.

During pressing, the granular appearance of the material is lost and any surface embossment on the heated pressure surfaces is impressed on the material and becomes a permanent feature of the product. An increase in density can also be observed.

DESCRIPTION OF THE PREFERRED EMBODIMENT

Typical temperature and pressure conditions are about 210° C. and about 120 p.s.i., respectively. The time necessary is of the order of a few minutes, but varies with the thickness and density of the starting material.

More generally, the preferred temperature range of the reconstituted foam material to be pressed is from 150° to 250° C. It has been found beneficial to pre-heat the material before pressing since this makes possible greater throughput in the pressing stage. Preferred pre-heating conditions are 1-5 minutes between infra-red radiators to a temperature of 150°-250° and more especially 175° to 210° C.

The preferred pressures employed in the pressing stage are in the range 5 to 30 tons/ft$^2$, more especially from 10 to 25 tons/ft$^2$. The dwell times of the foam material in the press depend on the thickness of the starting material and on the type of emboss required. Longer times are needed for deeply embossed surfaces as compared with smooth surfaces.

By way of example, the following are typical pressing times for different thicknesses of sheet:
For a deep emboss:
2.5 mm thickness—2 minutes
2.8 mm thickness—2½ minutes
3.0 mm thickness—3 minutes
3.5 mm thickness—3½ minutes
4.0 mm thickness—4 minutes
For a polished surface:
2.5 mm thickness—1 minute
3.0 mm thickness—2 minute The process of the invention is preferably applied to achieve products of final sheet thickness from 1.2 mm to 18 mm, although these limits are not critical. The most preferred range of product thickness is from 1.8 to 8 mm.

The process can be applied to any predominantly polyurethane reconstituted foam material of the requisite density, whether of the polyether or polyester type. The effect achieved is particularly surprising with the polyether type because this type of polyurethane has always been considered to be essentially non-thermoplastic and incapable of any kind of thermo-forming.

The process does not depend on the use of any particular kind of polyurethane binder in the preparation of the reconstituted starting material. Tolylene di-isocyanate cold curing systems, tolylene di-isocyanate pre-polymer systems and methylene di-isocyanate systems have all been successfully employed.

A variety of additions can be included in the reconstituted foam starting material to modify its properties and hence the properties of the compressed product. Such additions include flame-retardants, colorants, deodorants, fungicides and plasticizers. These can extend the range of application of the product and improve its performance.

The invention also provides shoe soles formed of the flexible sheet material defined above or moulded to shapes. Such soles may be embossed with patterns, by using engraved or otherwise figured platens, and colouring or surface lacquers may also be applied.

Soling materials prepared in this way show increased wear resistance, good flexibility and high slip resistance when worn.

The following are examples of the present preferred practice of this invention, in which all quantities are given in parts by weight unless the context indicates otherwise.

EXAMPLE I

1. Production of primary sheet

Polyether based polyurethane foam was ground to a particle size of less than 2 mm and then mixed with a binder to a formulation as follows:
Ground polyurethane—78.2 parts
Prepolymer formulation—10.2

Ethyl acetate—1.4
Activator solution—10.2

The prepolymer formulation is made up typically as follows:
Polyether polyol, mol.wt. 5000—100.0 parts
Amine catalyst (N,N-dimethylphenethylamine)—0.3
Tolylene diisocyanate (80/20)—40.6

An activator solution may be made up as follows:
Water—100 parts
Amine catalyst (as above)—1

The resulting mixture was charged into a mould and cured under pressure to yield a material of 60 lb/ft$^3$ density. Sheets were then cut from this material in a suitable thickness.

2. Heat Treatment of Sheet

A sheet of material cut from a piece of reconstituted material prepared as outlined in (1) and of 3½ mm thickness was put in a press between embossed heated platens and subjected to a pressure of 120 p.s.i.

The temperature of the platens was 210° C. and the pressure was maintained for 2 minutes.

After this time the sheet was removed and cooled. It had now lost its granular nature and increased its density while taking up a permanent impression of the embossing pattern.

EXAMPLE II

The following is a formulation including colour and plasticiser which can be substituted for that in Example I and used to produce a reconstituted foam which can thereafter be pressed to form a densified product as described in that Example.
Ground polyurethane foam 76.1 parts
Pigmented prepolymer composition 9.8
Solvent 6.5
Plasticiser (di-isodecyl phthalate) 7.6

EXAMPLE III

The following are test results on a typical product of the invention, made by a process substantially identical with that of Examples I and II.

1. Flex Test

The resistance of the product to damage by flexing is tested by the Ross Flex Test carried out in accordance with the standard SATRA Test Method PM60 (Shoe & Allied Trades Research Association).

The test is carried out at −5° C. and for a material to pass it must exhibit growth of a standard cut not exceeding 4.5 mm.

The products of this invention over a range of 2.5 to 3 mm thickness showed cut growths of only 1.5 to 2.5 mm.

2. Miscellaneous properties

Other physical properties for a material of 2.5 mm thickness were:
Density—57 lb/ft$^3$
Tensile strength—4000 KPa
Elongation—70%
Tear resistance—3 Kg/cm
Hardness (Shore A)—60–80
Abrasion resistance (Weight loss after 1000 cycles in Taber-H22 test)—2-2.5%
Cold flex at −35° C. (after 18 hours exposure)—No cracking

We claim:
1. A process for making wear-resistant flexible sheet material comprising the steps of:
providing a sheet of dense flexible reconstituted polyurethane foam material having a density exceeding about 15 lb/ft$^3$;
and subjecting said sheet to a pressure of about 5 to 30 tons/ft$^2$ at a temperature above about 150° C. in the substantial absence of air whereby said sheet is densified and its wear resistance enhanced.

2. The process of claim 1 wherein said pressing is carried out at a temperature in the range of about 150° to 250° C.

3. The process of claim 1 wherein said sheet is preheated to a temperature in the range of about 150° to 250° C. for a period of about 1 to about 5 minutes prior to pressing.

4. The process of claim 1 wherein said pressing is carried out for a period of 1 to 4 minutes depending on the thickness of said sheet.

5. The process of claim 1 wherein the polyurethane is of the polyether or polyester type.

6. The process of claim 1 wherein a material selected from the group consisting of a flame-retardant, a colorant, a deodorant, a fungicide and a plasticizer is added to the reconstituted foam starting material.

7. Wear-resistant flexible sheet material made by the process of claim 1.

8. A process for making wear-resistant flexible sheet material comprising the steps of:
providing a sheet of dense flexible reconstituted foam composed at least predominantly of polyurethane;
heating said sheet to a temperature in the range of about 150° to 250° C.;
and compressing said sheet at said temperature between heated platens to the substantial exclusion of air from all but peripheral portions of said sheet and under a pressure in the approximate range 5 to 30 tons/ft$^2$ for a period of about 1 to about 4 minutes to a final sheet thickness in the approximate range of 1.2 to 18 mm.

9. The process of claim 8 wherein said sheets are heated to a temperature of 175° to 210° C. over a period of 1 to 5 minutes prior to said pressing.

10. A process for making wear-resistant flexible sheet material comprising the steps of:
providing a sheet of dense flexible reconstituted polyether type polyurethane foam material having a density exceeding about 15 lb/ft$^3$; and
subjecting said sheet to a pressure of about 5 to 30 tons/ft$^2$ at a temperature above about 150° C. in the substantial absence of air whereby said sheet is densified and its wear resistance enhanced.

11. The process for making wear-resistant flexible sheet material of claim 10, wherein the temperature is in the range of 150° to 250° C.

12. The process for making wear-resistant flexible sheet material of claim 10, wherein the polyurethane foam material is preheated at a temperature of about 150° to 250° C. prior to the pressure treatment.

13. The process for making wear-resistant flexible sheet material of claim 10, wherein the reconstituted polyurethane foam material is fully cured.

14. Wear-resistant flexible sheet material made by the process of claim 10.

* * * * *